United States Patent
Ting et al.

(10) Patent No.: US 7,693,484 B2
(45) Date of Patent: Apr. 6, 2010

(54) DYNAMIC NETWORKING MODES METHOD AND APPARATUS

(75) Inventors: Albert H. Ting, Santa Clara, CA (US); Francis James Canova, Jr., Fremont, CA (US)

(73) Assignee: Palm, Inc., Sunnyvale, CA (US)

( * ) Notice: Subject to any disclaimer, the term of this patent is extended or adjusted under 35 U.S.C. 154(b) by 1418 days.

(21) Appl. No.: 10/158,338

(22) Filed: May 30, 2002

(65) Prior Publication Data

US 2003/0142652 A1  Jul. 31, 2003

Related U.S. Application Data

(60) Provisional application No. 60/352,785, filed on Jan. 29, 2002.

(51) Int. Cl.
*H04B 7/00* (2006.01)
(52) U.S. Cl. .................. 455/41.2; 455/556.1; 455/557; 455/11.1; 709/248; 709/213; 370/310.2; 370/311
(58) Field of Classification Search ............... 455/41.2, 455/556.1, 557, 11.1; 709/248, 213; 370/310.2, 370/311
See application file for complete search history.

(56) References Cited

U.S. PATENT DOCUMENTS

| | | | |
|---|---|---|---|
| 4,650,929 A | 3/1987 | Boerger et al. | |
| 5,010,547 A | 4/1991 | Johnson et al. | |
| 5,012,219 A | 4/1991 | Henry | |
| 5,075,684 A | 12/1991 | DeLuca | |
| 5,208,745 A | 5/1993 | Quentin et al. | |
| 5,276,680 A * | 1/1994 | Messenger | 370/311 |
| 5,293,639 A * | 3/1994 | Wilson et al. | 455/17 |
| 5,359,317 A | 10/1994 | Gomez et al. | |
| 5,374,334 A | 12/1994 | Sommese et al. | |
| 5,394,140 A | 2/1995 | Wong et al. | |
| 5,430,436 A | 7/1995 | Fennell | |
| 5,612,682 A | 3/1997 | DeLuca et al. | |
| 5,650,776 A | 7/1997 | Mitchell et al. | |
| 5,689,553 A | 11/1997 | Ahuja et al. | |
| 5,705,995 A | 1/1998 | Laflin et al. | |

(Continued)

FOREIGN PATENT DOCUMENTS

GB  2313258  11/1997

OTHER PUBLICATIONS

Howstuffworks: How Wireless Networking Works: Wireless Networking [online] [retrieved on Dec. 7, 2001], pp. 1-3. Retrieved from the Internet <http://www.howstuffworks.com/wireless-network1.html>.

(Continued)

*Primary Examiner*—Marceau Milord
(74) *Attorney, Agent, or Firm*—Foley & Lardner LLP

(57) ABSTRACT

A portable electronic device is disclosed. The portable electronic device includes a wireless transceiver, a processor coupled to the wireless transceiver, a memory coupled to the processor and a program stored in the memory and running on the processor. The program provides automatic transitioning between a wireless infrastructure communication mode to an ad-hoc communication mode. The infrastructure mode is used when a request from a mobile device is received to access a communications network. The ad-hoc mode is used when a request from the mobile device is received to access resources on the portable electronic device.

18 Claims, 5 Drawing Sheets

U.S. PATENT DOCUMENTS

| | | | |
|---|---|---|---|
| 5,812,945 | A | 9/1998 | Hansen et al. |
| 5,844,600 | A | 12/1998 | Kerr |
| 5,854,975 | A | 12/1998 | Fougnies et al. |
| 5,873,045 | A | 2/1999 | Lee et al. |
| 5,875,186 | A | 2/1999 | Belanger et al. |
| 5,903,852 | A | 5/1999 | Schaupp, Jr. et al. |
| 5,907,604 | A | 5/1999 | Hsu |
| 5,909,239 | A | 6/1999 | Lee |
| 5,925,127 | A * | 7/1999 | Ahmad .................. 726/31 |
| 5,958,006 | A | 9/1999 | Eggleston et al. |
| 5,974,334 | A | 10/1999 | Jones, Jr. |
| 6,029,062 | A | 2/2000 | Hanson |
| 6,067,291 | A | 5/2000 | Kamerman et al. |
| 6,141,531 | A | 10/2000 | Williams et al. |
| 6,141,533 | A * | 10/2000 | Wilson et al. .......... 455/11.1 |
| 6,157,630 | A | 12/2000 | Adler et al. |
| 6,166,734 | A * | 12/2000 | Nahi et al. .............. 715/748 |
| 6,185,414 | B1 | 2/2001 | Brunner et al. |
| 6,188,917 | B1 | 2/2001 | Laureanti |
| 6,202,060 | B1 | 3/2001 | Tran |
| 6,216,112 | B1 * | 4/2001 | Fuller et al. ............... 705/14 |
| 6,252,544 | B1 | 6/2001 | Hoffberg |
| 6,259,891 | B1 | 7/2001 | Allen |
| 6,285,889 | B1 | 9/2001 | Nykanen et al. |
| 6,300,946 | B1 * | 10/2001 | Lincke et al. .............. 715/700 |
| 6,327,152 | B1 | 12/2001 | Saye |
| 6,332,163 | B1 | 12/2001 | Bowman-Amuah |
| 6,345,279 | B1 | 2/2002 | Li et al. |
| 6,346,963 | B1 | 2/2002 | Katsumi |
| 6,356,905 | B1 | 3/2002 | Gershman et al. |
| 6,377,981 | B1 | 4/2002 | Ollikainen et al. |
| 6,389,457 | B2 | 5/2002 | Lazaridis et al. |
| 6,396,816 | B1 * | 5/2002 | Astle et al. ............... 370/264 |
| 6,401,085 | B1 | 6/2002 | Gershman et al. |
| 6,429,812 | B1 | 8/2002 | Hoffberg |
| 6,438,585 | B2 | 8/2002 | Mousseau et al. |
| 6,438,594 | B1 | 8/2002 | Bowman-Amuah |
| 6,463,464 | B1 * | 10/2002 | Lazaridis et al. ............ 709/207 |
| 6,467,084 | B1 * | 10/2002 | Howard et al. ............. 717/136 |
| 6,470,396 | B2 * | 10/2002 | Tognazzini ................ 709/248 |
| 6,542,167 | B1 * | 4/2003 | Darlet et al. .............. 715/762 |
| 6,542,854 | B2 * | 4/2003 | Yang et al. ................ 702/186 |
| 6,553,240 | B1 | 4/2003 | Dervarics |
| 6,560,208 | B1 * | 5/2003 | Takahari .................. 370/327 |
| 6,564,051 | B2 | 5/2003 | Struhsaker et al. |
| 6,577,622 | B1 | 6/2003 | Schuster et al. |
| 6,600,421 | B2 | 7/2003 | Freeman |
| 6,601,139 | B1 * | 7/2003 | Suzuki ..................... 711/115 |
| 6,625,439 | B2 | 9/2003 | Laybourn et al. |
| 6,654,787 | B1 * | 11/2003 | Aronson et al. ........... 709/206 |
| 6,665,521 | B1 | 12/2003 | Gorday et al. |
| 6,675,012 | B2 | 1/2004 | Gray |
| 6,779,023 | B2 * | 8/2004 | Tognazzini ................ 709/208 |
| 6,813,765 | B1 * | 11/2004 | Flores ....................... 717/174 |
| 6,873,692 | B1 * | 3/2005 | Silver et al. ............ 379/142.17 |
| 6,906,741 | B2 | 6/2005 | Canova, Jr. et al. |
| 6,950,677 | B2 | 9/2005 | Lo et al. |
| 6,950,859 | B1 | 9/2005 | Bartek et al. |
| 6,950,946 | B1 * | 9/2005 | Droz et al. ................ 726/35 |
| 6,952,617 | B1 | 10/2005 | Kumar |
| 6,996,816 | B1 * | 2/2006 | Bohan ...................... 717/169 |
| 7,003,040 | B2 * | 2/2006 | Yi ......................... 375/240.24 |
| 7,047,276 | B2 * | 5/2006 | Liu et al. .................. 709/201 |
| 7,058,050 | B2 * | 6/2006 | Johansson et al. .......... 370/386 |
| 7,062,573 | B2 * | 6/2006 | Tognazzini ................ 709/248 |
| 7,076,239 | B2 | 7/2006 | Kirkup et al. |
| 7,092,696 | B1 | 8/2006 | Hosain et al. |
| 7,096,037 | B2 | 8/2006 | Canova, Jr. et al. |
| 7,103,656 | B2 * | 9/2006 | Lewis et al. ............... 709/223 |
| 7,103,760 | B1 * | 9/2006 | Billington et al. ............. 713/1 |
| 7,120,129 | B2 * | 10/2006 | Ayyagari et al. ............ 370/255 |
| 7,159,039 | B1 * | 1/2007 | Hahn et al. ................ 709/246 |
| 7,194,263 | B2 * | 3/2007 | Bahl et al. ................ 455/432.1 |
| 7,231,208 | B2 * | 6/2007 | Robertson et al. ............ 455/416 |
| 7,444,669 | B1 | 10/2008 | Bahl et al. |
| 2002/0071416 | A1 | 6/2002 | Carlson et al. |
| 2002/0093531 | A1 | 7/2002 | Barile |
| 2002/0111137 | A1 * | 8/2002 | Walkup ....................... 455/22 |
| 2002/0138851 | A1 | 9/2002 | Lord et al. |
| 2002/0177431 | A1 | 11/2002 | Hamilton et al. |
| 2002/0178343 | A1 | 11/2002 | Tsai et al. |
| 2002/0183038 | A1 | 12/2002 | Comstock et al. |
| 2003/0149724 | A1 | 8/2003 | Chang |
| 2003/0152053 | A1 | 8/2003 | Evans et al. |
| 2003/0182425 | A1 | 9/2003 | Kurakake |
| 2003/0202494 | A1 | 10/2003 | Drews et al. |
| 2004/0097246 | A1 | 5/2004 | Bodnar et al. |
| 2004/0203380 | A1 | 10/2004 | Hamdi et al. |
| 2004/0204041 | A1 | 10/2004 | Fillebrown et al. |
| 2005/0038701 | A1 | 2/2005 | Matthew |
| 2005/0226172 | A1 | 10/2005 | Richardson et al. |
| 2007/0060106 | A1 | 3/2007 | Haverinen et al. |
| 2007/0167149 | A1 | 7/2007 | Comstock et al. |
| 2008/0032738 | A1 | 2/2008 | Boyer et al. |

OTHER PUBLICATIONS

Howstuffworks: How Wireless Networking Works: HomeRT and SWAP [online] [retrieved on Dec. 7, 2001], pp. 1-3. Retrieved from the Internet <http://www.howstuffworks.com/wireless-network2.htm>.

Schwartz, Ephraim, "Bluetooth Comes of Age", Wireless World, Opinion [online] [retrieved on Oct. 18, 2001], pp. 1-2. Retrieved from the Internet <http://www.infoworld.com/articles/op/sml/01/06/25/010625opwirele...>.

Ad-Hoc Communication Between HP Journadas [online] [retrieved on Oct. 18, 2001] pp. 1-2. Retrieved from the Internet <http://cairo.cs.uiuc.edu/HPJournada/adhoc.html>.

Johansson, Per, et al., Comments on Ericsson Review paper on ad-hoc networking: Ad-hoc IP Networks over Bluetooth [online] [retrieved on Oct. 18, 2001], pp. 1-14. Retrieved from the Internet <http://www.isoc.org/inet2001/CD_proceedings/T59/INET_Bluetooth2>.

The Mobile Triangle [online] [retrieved on Nov. 13, 2001], pp. 1-3. Retrieved from the Internet <http://www.salutation.org/scenario/scenario15.htm>.

DSTC m3 Student Project: Project Description [online] [retrieved on Nov. 13, 2001], pp. 1-2. Retrieved from the Internet <http://www.dstc.edu.au/m3/student.htm>.

DSTC m3 Project Goals: Museum Application [online] [retrieved on Nov. 13, 2001], pp. 1-3. Retrieved from the Internet <http://www.dstc.edu.au/m3/irx.htm>.

News: Pocit Labs Announces BlueTalk, the First Bluetooth-Enabled P2P Network Client, Mar. 7, 2001 [online] [retrieved on Nov. 13, 2001], pp. 1-3. Retrieved from the Internet <http://www.thinkmobile.com/News/00/32/26/>.

Geographic Computing with Salutation: Salutation Pitches Geographic Computing Architecture for Palm-Size and Hand Held Computers: White Paper Details Benefits, Development Opportunities for Consumer Applications, Press Release, Jan. 5, 1999 [online] [retrieved on Nov. 13, 2001], pp. 1-2. Retrieved from the Internet <http://www.saluation.org/pr-geo.htm>.

Vance, Ashlee, "Palm Takes Baby Steps Toward Bluetooth", PCWorld.com, Jun. 7, 2001 [online] [retrieved on Nov. 13, 2001], pp. 1-2. Retrieved from the Internet <http://www.pcworld.com/news/article/0,aid,52043,00.asp>.

CSEE Innovative EXPO 2000—Projects, "Piconet—A Wireless Ad Hoc Network for Mobile Handheld Devices" [online] [retrieved on Nov. 13, 2001], pp. 1-2. Retrieved from the Internet <http://innovexpo.csee.uq.edu.au/2000/341472962.htm>.

Outpost.com: Product Detail regarding DWL-500 802.11B Wireless LAN PCI Card 11 Mbps [online] [retrieved on Dec. 21, 2001], pp. 1-3. Retrieved from the Internet <http://www.outpost.com/product/2975145>.

Ericsson.com: Technology: WLAN (Two MSc Thesis Projects) [online] [retrieved on Dec. 21, 2001], pp. 1-3. Retrieved from the Internet <http://www.ericsson.com/systech/wlan.shtml>.

802.11—Plant's Webopedia definition and links: Infrastructure Mode [online] [retrieved on Dec. 21, 2001], pp. 1-3. Retrieved from the Internet <http//0211-planet.webopedia.com/TERM/infrastructure_mode.ht . . . >.

802.11—Planet's Webopedia definition and links: Ad-Hoc Mode [online] [retrieved on Dec. 21, 2001], pp. 1-3. Retrieved from the Internet <http//80211-planet.webopedia.com/TERM/a/ad_hoc_mode.html>.

802.11—Planet's Webopedia definition and links: 802.11 [online] [retrieved on Dec. 21, 2001], pp. 1-4. Retrieved from the Internet <http://80211-planet.webopedia.com/TERM/8/802_11.html>.

Lough, Daniel L., et al., IEEE 802.11 A Short Tutorial on Wireless LANs and IEEE 802.11 [online] [retrieved on Dec. 21, 2002], pp. 1-6. Retrieved from the Internet <http://www.computer.org/students/looking/summer97/ieee.802.htm>.

D-Link Technical Support—Main Page, D-Link Air DWL-650 IEEE 802.11b PCMCIA Wireless Adapte Frequently Asked Questions (FAQ) [online] [retrieved on Dec. 12, 2001] pp. 1-5. Retrieved from the Internet <http://www.dlink.com/tech/faq/wireless/dwl650/>.

D-Link 802.11b Compact Flash Adapter Release, Aug. 1, 2001 [online] [retrieved on Dec. 21, 2001], pp. 1-3. Retrieved from the Internet <http://www.practicallynetworked.com/news/dlink_DCF_650W_PR.ht . . . >.

D-Link 11-Megabit IEEE 802.11b Wireless Networking Debuts at Comdex, Press Release, Nov. 13, 2000 [online] [retrieved on Dec. 21, 2002], pp. 1-3. Retrieved from the Internet <http://presslink.dlink.com/releases/pr111300.htm>.

D-Link Slashes Pricing on Award Winning 11-Megabit IEEE 802.11b Wireless Networking Products, Press Release Feb. 28, 2001 [online] [retrieved on Dec. 21, 2002], pp. 1-3. Retrieved from the Internet <http://presslink.dlink.com/releases/pr022801.htm>.

Dell.com: Product Details: D-Link Systems-D-Link DWL-650 Wireless LAN PCMCIA Card 802.11b 11 Mbps [online] [retrieved on Dec. 21, 2002], pp. 1-2. Retrieved from the Internet <http://accessories.us.dell.com/sna/productdetail.asp?TabPage=Prod . . . >.

Selecting the Wireless LAN Operating Mode Quick Guide, Copyright © Nokia Internet Communications Inc 1999. Date: May 17, 2000, pp. 1-6.

Pascoe, Bob, Geographic Computing: Enabling New Markets for Hand Held and Palm-Size Information Appliances: A Salutation White Paper, Dec. 16, 1998, pp. 1-13.

Aguayo, Daniel, et al., Grid: Building a Robust Ad Hoc Network, Parallel and Distributed Operating Systems Group, M.I.T. Laboratory for Computer Science, pp. 1-2.

Amir, Elan, et al., Receiver-driven Bandwidth Adaptation for Lightweight Sessions, University of California, Berkeley, pp. 415-426

Hodes, Todd D., et al., Composable Ad hoc Location-based Services for Heterogeneous Mobile Clients, University of California, Berkeley, dated May 5, 1998, pp. 1-16.

Sanneblad, Johan, BluePortal: A Framework for Mobile Ad Hoc Network Applications, Viktoria Institute [online] [printed on Sep. 10, 2002], pp. 1-14. Retrieved from the Internet <http://iris24.ifi.uib.no/proceedings/printed-papers/136-138-Sanneblad-printed.pdf>.

Raychaudhuri, D. et al., "Mobile Multimedia Applications in the WATMnet Broadband Wireless System: Software Architecture and Media Processing Considerations", *Signals System & Computers*, 1998, Conference Record of the $32^{nd}$ Asilomar Conference on Pacific Grove, CA, USA, Nov. 1-4, 1998, Piscataway, NJ, USA, IEEE, US, Nov. 1, 1998, pp. 73-77, XP010324332, ISBN: 0-7803,5148-7, p. 73-p. 75.

Form PCT/ISA/220 (Jul. 1998) for PCT International application No. PCT/ US 02/ 37216 dated Mar. 11, 2003.

U.S. Appl. No. 11/478,435, filed Jun. 29, 2006, Canova, Jr. et al.
U.S. Appl. No. 11/365,281, filed Feb. 28, 2006, Boyer et al.
U.S. Appl. No. 10/158,338, filed May 30, 2002, Ting et al.
U.S. Appl. No. 10/159,398, filed May 30, 2002, Canova, Jr. et al.
U.S. Appl. No. 09/871,111, filed May 31, 2001, Comstock et al.
Daniel L. Lough et al., A Short Tutorial on Wireless LANs and IEEE 802.11, printed at Internet address http://www.computer.org/students/looking/summer97/ieee802.htm on May 7, 2001, 6 pages.

U.S. Patent Application for Videoconferencing Bandwidth Management for a Handheld Computer System and Method, U.S. Appl. No. 10/159,398, Filed May 30, 2002, Inventors, Francis, J. Canova, Jr., Albert H. Ting, 42 pages.

* cited by examiner

DYNAMIC NETWORKING MODES METHOD AND APPARATUS

REFERENCE TO RELATED APPLICATIONS

This application claims the benefit of U.S. Provisional Application No. 60/352,785, filed Jan. 29, 2002, the entirety of which is herein incorporated by reference.

BACKGROUND

The marketplace for portable computing devices has demanded increasing features, particularly relating to wireless communications. Wireless communication features provide convenience and accessibility to consumers, and improved productivity for businesses. Currently, many wireless standards are competing in the portable computing device market. Such standards include time division multiple access (TDMA), code division multiple access (CDMA), global system for mobile (GSM) communication, general packet radio service (GPRS), IEEE 802.11, shared wireless access protocol (SWAP), infrared direct access (IrDA), Bluetooth, etc. Each of these systems have limitations and drawbacks including those related to providing communications to and from communications networks as well as providing peer-to-peer communications between mobile devices.

One known system is a wireless communication system using radio frequencies for transmitting and receiving voice, video, and data signals. This system includes an internal network having multiple internal communication paths and an external network communication path for linking the internal network to an external communications network. The internal network contains transceivers that allow for decentralized communication along multiple communication paths within the internal network. If the transceivers are out of range of a central call switching and delivery center, they can communicate via intermediate transceivers that relay the calls to the destination transceivers, eliminating the need for a central call switching and delivery center.

In such a system, the mobile devices having transceivers need to know whether they are communicating in an ad-hoc mode in which they are communicating between each other, or whether they are communicating with a communications network such that they should be operating in an infrastructure mode. Certain devices today may allow a communications device to be configured in either an ad-hoc mode or in an infrastructure mode but convenient switching between the two modes is not seen as seamless or simple. In certain devices, a manual switching or changing of a jumper may be required for the communications to be transitioned from one mode to the other.

Accordingly, there is a need for an improved wireless communication system. Further, there is a need for a wireless communications system and method that provides simplified transitioning between wireless access modes. Further still, there is a need for a wireless communications system and method that provides simple ad-hoc networking as well as infrastructure networking. Yet further still, there is a need for a portable electronic device that may be automatically switched from an ad-hoc networking mode to a fixed access point mode upon the receipt of a specified request or upon a specified action.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

One embodiment of the invention relates to a portable electronic device. The portable electronic device includes a wireless transceiver, a processor coupled to the wireless transceiver, a memory coupled to the processor and a program stored in the memory and running on the processor. The program provides automatic transitioning between a wireless infrastructure communication mode to an ad-hoc communication mode. The infrastructure mode is used when a request from a mobile device is received to access a communications network. The ad-hoc mode is used when a request from the mobile device is received to access resources on the portable electronic device.

Another embodiment of the invention relates to a method of using a handheld computer for ad-hoc networking. The method includes receiving an ad-hoc communications request from a mobile device, and automatically transitioning the handheld computer from an infrastructure communications mode to an ad-hoc communications mode upon receipt of the request.

Yet another embodiment of the invention relates to a portable device configured as a repeater. The portable device includes a means for providing communications between the portable device and a wired network, a means for automatically putting the portable device in a fixed network communications mode, a means for receiving a data signal wirelessly, and a means for forwarding the data signal wirelessly to a network user node.

Yet still another embodiment of the invention relates to an access point. The access point includes a handheld computer, a transceiver associated with the handheld computer for receiving a wireless transmission, and a program running on the handheld computer that automatically transitions the handheld computer into an infrastructure mode when the handheld computer is in communication with a communications network and a mobile device requests access to the communications network.

Yet still another embodiment of the invention relates to a method of using a handheld computer as a wireless access point. The method includes providing a direct communications link between a handheld computer and a communications network. The method also includes transitioning the handheld computer from an ad-hoc network mode to an infrastructure mode when access to the communications network is requested by a mobile device. Further, the method includes communicating, over a wireless communications channel, data from the mobile device to the handheld computer and to the communications network.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED
AND EXEMPLARY EMBODIMENTS

Figure 1:
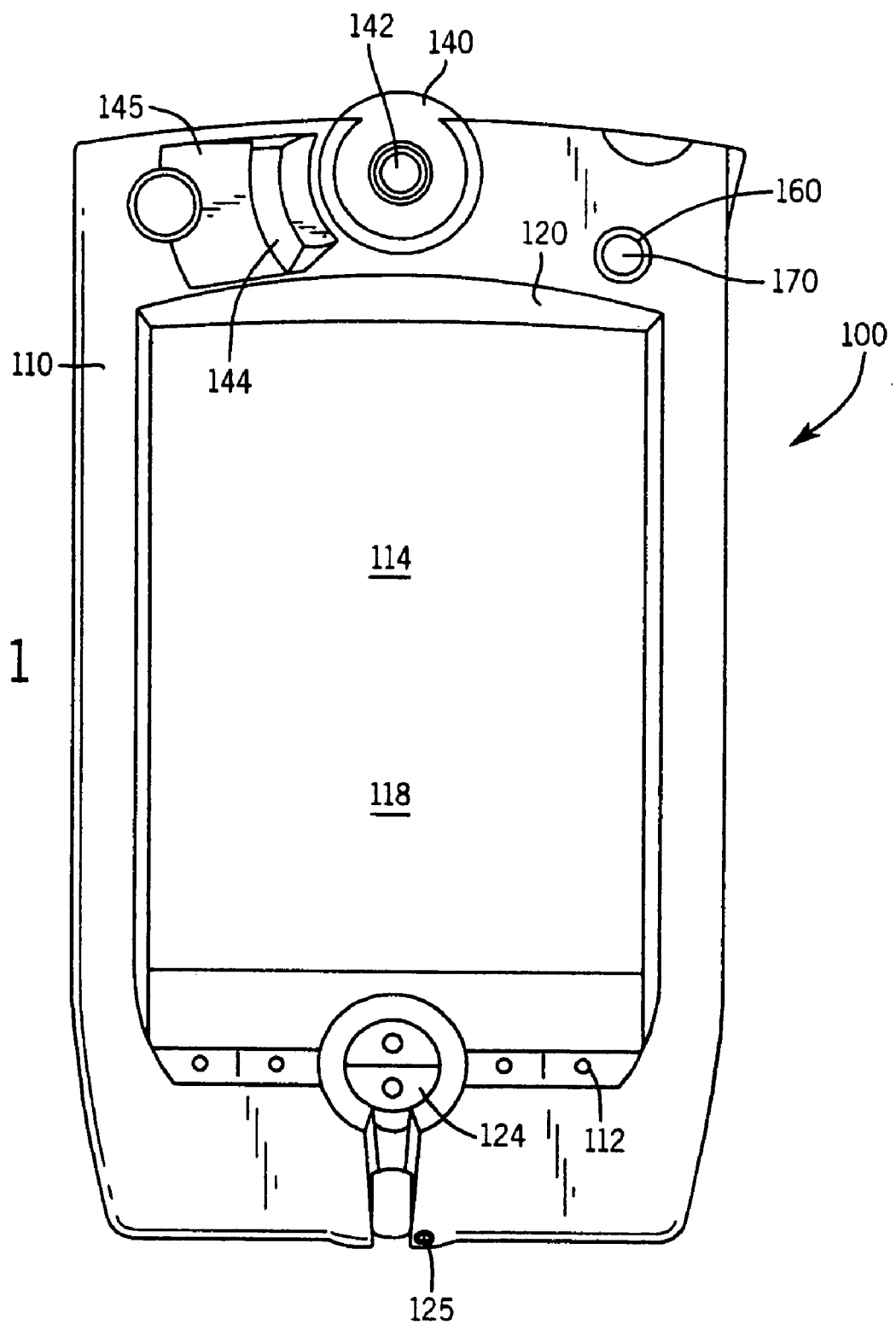
FIG. 1 is an exemplary illustration of a handheld computer.

Referring to FIG. 1, a handheld computer 100 is depicted according to an exemplary embodiment. Handheld computer 100 may include Palm style computers manufactured by Palm, Inc., of Santa Clara, Calif. as well as other handheld computers. Handheld computer 100 is representative of the type of mobile device which may use the invention disclosed and/or be part of the inventive system disclosed. Handheld computer 100 is described as "handheld" to indicate a small, portable size as compared to less portable computing or electronic devices. Handheld computer 100 can also be located on a desk, a lap, a wrist, a belt, or any other position or location and may generally be transported on a belt clip, in a wallet of suitable size, in a purse, in a pocket, etc.

Preferably, handheld computer 100 includes interactive hardware and software that perform functions such as maintaining calendars, phone lists, task lists, note pads, calculator applications, spreadsheets, games, and other applications capable of running on a computing device. Further, handheld computer 100 may be configured for such functions as voice memo recording and playback as well as communications network connectivity, internet connectivity, wireless messaging, e-mail, always-on e-mail, wireless telephony, audio playback, audio communications, video playback, video communications (e.g., video conferencing), etc.

Handheld computer 100, depicted in FIG. 1, includes a housing 110, a plurality of input function keys 112 and a display 114 having graphical user interface features. Housing 110 may be formed from any of a variety of materials, including plastics, metals, metal alloys, and polymers. Display 114 may be provided with a touch screen interface that allows a user to select and alter displayed content using a pointer, such as but not limited to a stylus, a pen tip, a fingertip, or other pointing devices. Display 114 can also be provided with a clear cover to allow for viewing, but not input by touching.

Referring again to FIG. 1, in an exemplary embodiment, display 114 also can include a GRAFFITI™ (or other handwriting recognition software) writing section 118 for tracing alpha-numeric characters as input. In an exemplary embodiment, writing section 118 may be located on any pre-designated portion of display 114, may be moved to different locations on display 114, or may be removed entirely from display 114. A plurality of input icons for performing automated or preprogrammed functions may be provided on a portion of display 114.

In an exemplary embodiment, handheld computer 100 may include one or more integrated antennas 120 configured to transmit and receive wireless communication signals, such as, but not limited to, cellular telephone communication signals, general packet radio system (GPRS) signals, IEEE 802.11 signals, and other radio frequency (RF) communications signals using an RF transceiver.

In an exemplary embodiment, handheld computer 100 also includes navigation buttons 124 that may be utilized for navigating or scrolling of information displayed on display 114. Further, navigation buttons 124 may be programmed for other uses depending on the application running on handheld computer 100. Handheld computer 100 may be used for any of a variety of wireless communications, including, but not limited to, communications with the World Wide Web, mobile telephone communications, e-mail communications, audio conferencing, video conferencing, etc.

In an exemplary embodiment, a messaging indicator 160 (such as a light) may be incorporated into housing 110. Messaging indicator 160 may be used to indicate various messaging statuses, such as, but not limited to, message received, message being sent, urgent message received, etc. A dedicated messaging button 170 may also be incorporated into housing 110. Messaging button 170 may be used for a variety of purposes, including, but not limited to, starting a messaging program, such as an e-mail program or an instant messaging program. Further, messaging button 170 may be used to automatically address an e-mail or an instant message after the instant message has been received and the messaging button is switched or pressed. The message will be automatically addressed to the originator of the received message, and further, a window or application for entering the text or other data of the reply message is opened such that such data can be entered. Messaging indicator 160 may be a light incorporated into messaging button 170, may be a lighted ring around button 170, may be a light disassociated with button 170, or may be an alternative indicator, such as a sound indicator, or a vibration indicator.

In an exemplary embodiment, handheld computer 100 may be coupled to a cradle, such as a synchronization cradle. The cradle may include a platform configured to receive handheld computer 100, and a power or data cord (which, in an exemplary embodiment may be, but is not limited to a universal serial bus (USB) cord). The cradle may be coupled to a personal computer and a wall outlet to supply power to the cradle. Alternatively, the cradle may draw power through the data cord from the personal computer.

Handheld computer 100 can include a video camera 140 and a speaker 144. In an exemplary embodiment, video camera 140 includes a lens portion 142 and is formed as an integral part of handheld computer 100. Alternatively, video camera 140 can be separate from handheld computer 100 and attached as a peripheral device. Where video camera 140 is integral to handheld computer 100, lens portion 142 can be located in a recessed position. Using camera 140, a message being sent by a messaging application can include functionality to include video and/or audio data in the message.

Speaker 144 can be any of a variety of audio devices capable of reproducing human voice communications such as voices of participants in a video conference, music, etc. In an alternative embodiment, speaker 144 may be substituted by a buzzer. Further, in an alternative embodiment, it may be preferable to include two or more speakers 144 disposed in other areas of housing 110 to provide stereophonic sound or multiple sound channels. Preferably, speaker 144 is integral to handheld computer 100. A speaker chamber 145 is integrated into housing 110. Handheld computer 100 also includes a microphone 125 that is integral to handheld computer 100. Microphone 125 may be configured to receive and transmit audio signals at handheld computer 100. In the example of a video conference, the microphone can receive and communicate the voice of the handheld user.

Figure 2:
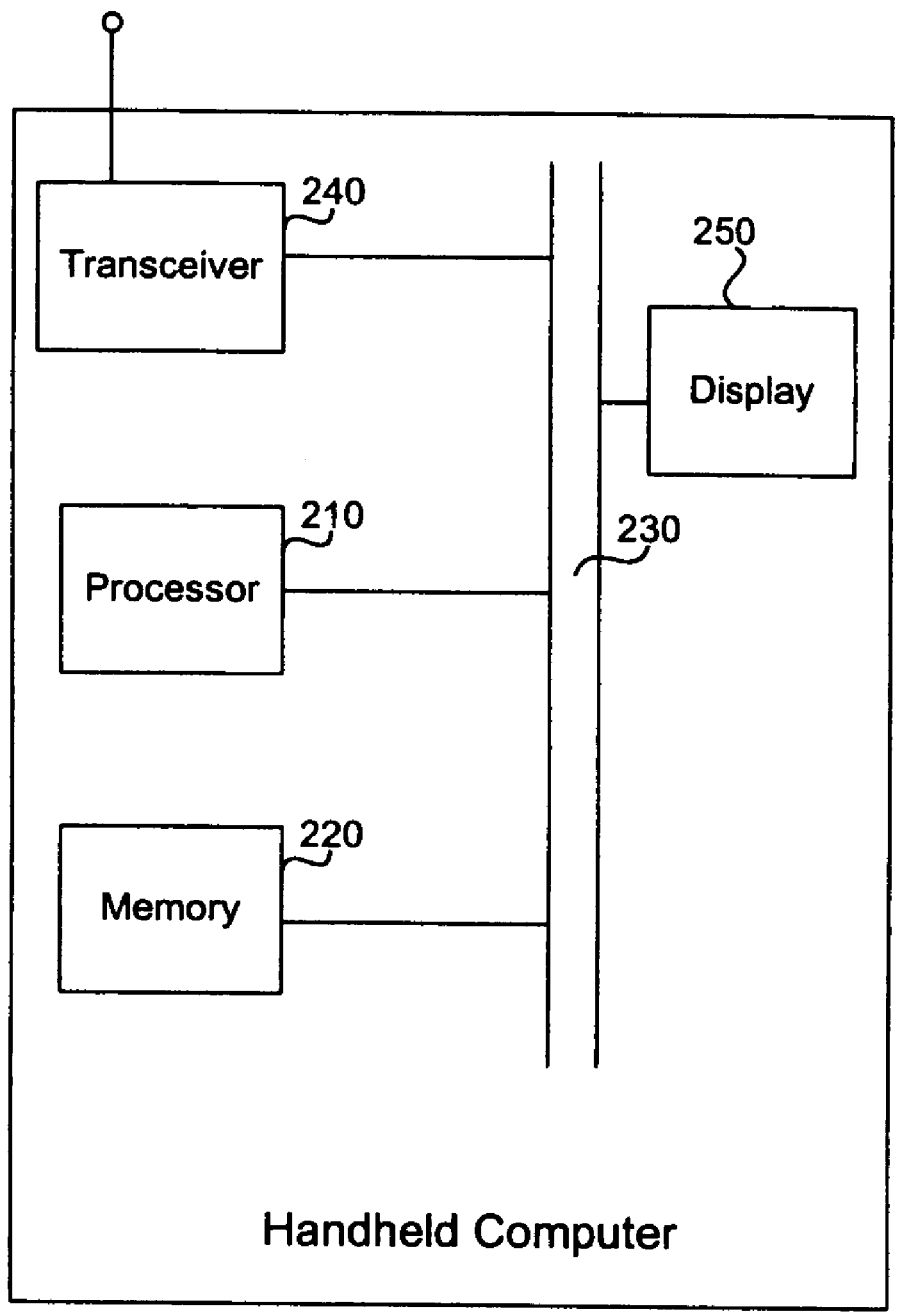
FIG. 2 is an exemplary block diagram of a handheld computer.

Referring now to FIG. 2, a generalized block diagram of handheld computer 200 is depicted. Handheld computer 200 includes a plurality of computing electronics including, but not limited to, a processor 210, a memory 220, a communications bus 230, a radio frequency transceiver 240 and a display 250. Processor 210 is used to interpret program instructions which may be stored in memory 220. Such program instructions may be used to display content on display 250. Further, such program instructions may be used to perform network communications, including but not limited to messaging.

Figure 3:
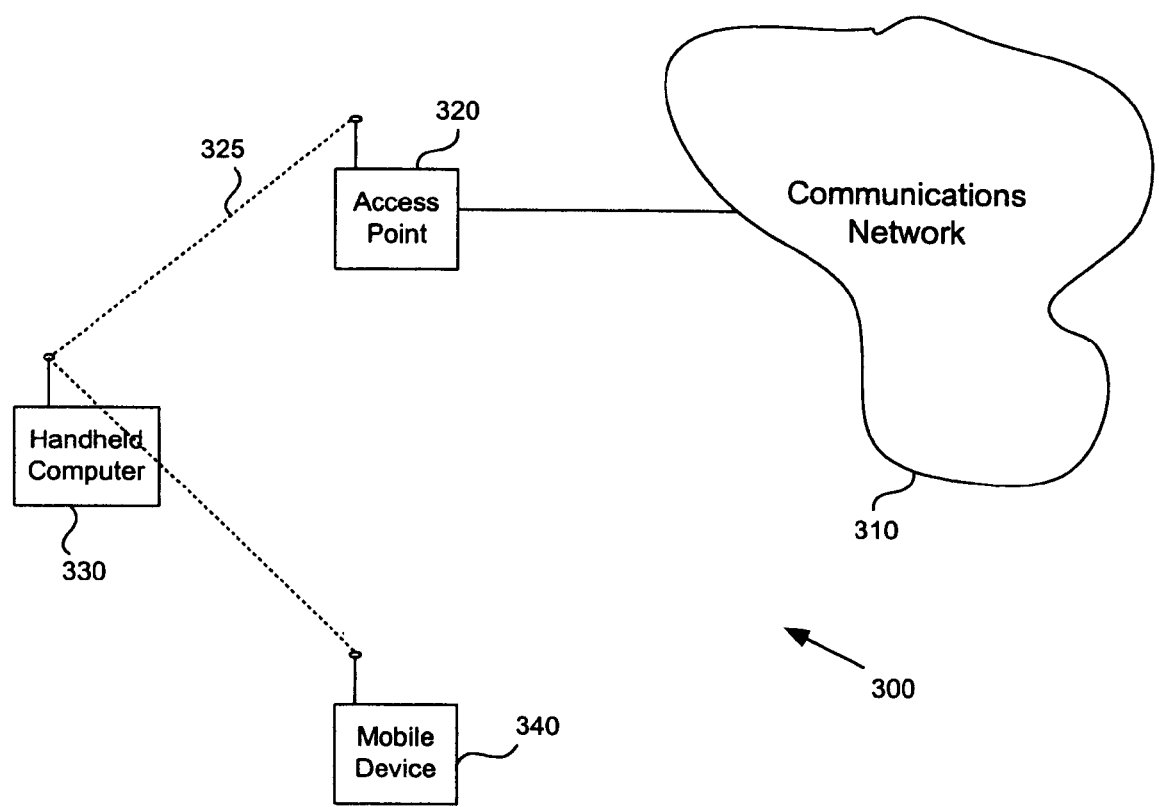
FIG. 3 is an exemplary block diagram of a mobile device connecting to a communications network via a handheld computer.

Referring now to FIG. 3, a communications system 300 is depicted. Communications system 300 includes a communications network 310 which may be any of a variety of communications networks, including but not limited to, the Internet and/or a local area network (LAN). Among other server computers and access points related to communications network 310, an access point 320 is coupled thereto. Access point 320 may be any of a variety of access points, including but not limited to, a wireless access point such as those using any of a variety of wireless communications protocols, including but not limited to, IEEE 802.11 communications protocols, Bluetooth protocols, shared wireless access protocols (SWAP), infrared direct access (IrDA) protocols, and the like. A handheld computer 330 may communicate with access point 320 via a wireless link 325 to gain access to services and resources on communications network 310.

In an exemplary embodiment, a mobile device 340 may be out of range of access point 320 or may otherwise not be able to communicate with access point 320 because it is not authorized to do so or for other reasons such as mobile device 340 may not be properly configured to communicate with access point 320. In such an instance, it may be desirable to utilize handheld computer 330 as an access point to communications network 310 for mobile device 340. In such an instance, handheld computer 330 may be automatically configured in an infrastructure mode when a request from mobile device 340 is sent to handheld computer 330 asking for access to communications network 310.

In an exemplary embodiment, handheld computer 330 may be using an IEEE 802.11 communications protocol, the infrastructure mode used in IEEE 802.11 allows wireless devices to communicate with each other and with a wired network. Accordingly, mobile device 340 views handheld computer 330 simply as an access point to communications network 310. Because handheld computer 330 is automatically transitioned from an ad-hoc networking mode or other communications mode to an infrastructure mode (access point mode) upon the receipt of a request from mobile device 340 or upon some other action, mobile device 340 may or may not be aware of the use of handheld computer 330 as an access point to communications network 310. Thus, mobile device 340 views its communication with communications network 310 as virtually seamless.

Figure 4:
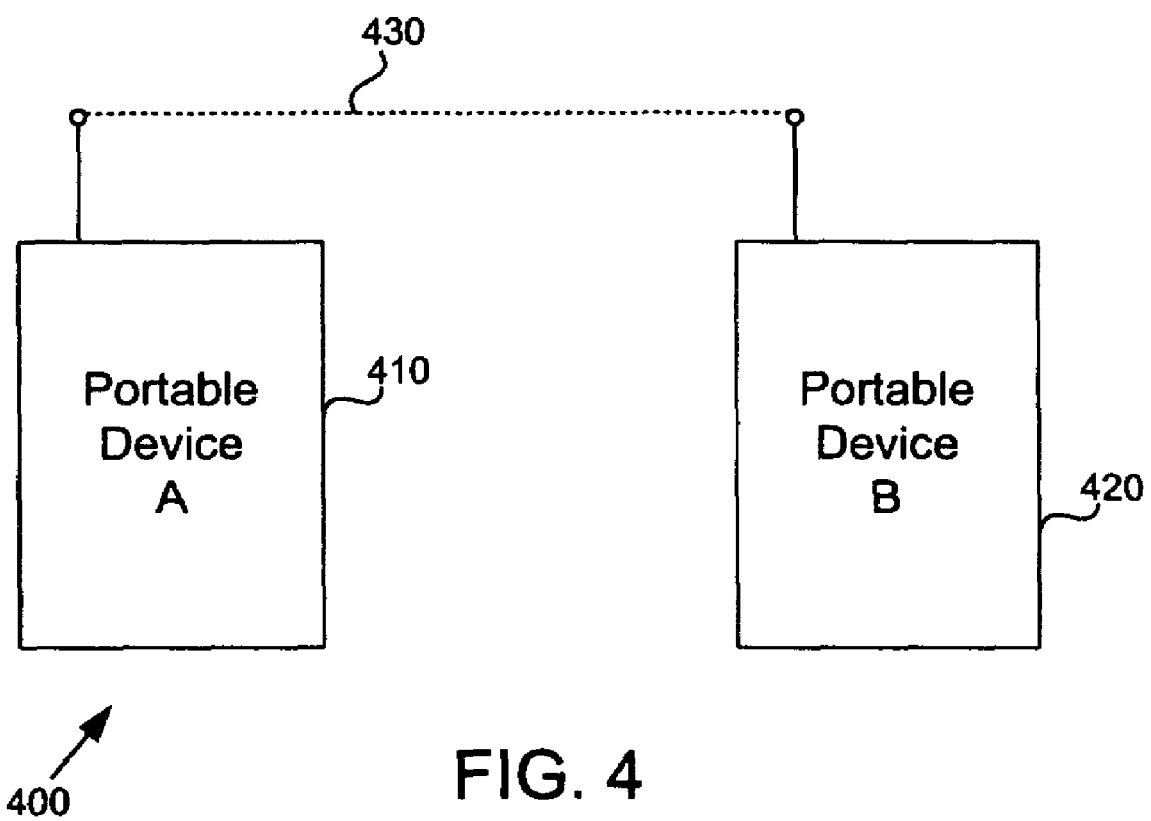
FIG. 4 is an exemplary embodiment of two portable electronic devices communicating in a peer-to-peer or ad-hoc mode.

Referring now to FIG. 4, an ad-hoc or peer-to-peer networking system 400 is depicted. The exemplary networking system depicted includes an electronic portable device A 410 and an electronic portable device B 420. Each electronic portable device 410 and 420 utilizes a wireless transceiver to communicate across a link 430. In an exemplary embodiment, portable device A 410 may include a wireless transceiver and software which is configured to automatically transition from an infrastructure mode, such as that used by handheld computer 330 with reference to FIG. 3, to an ad-hoc networking mode in which peer-to-peer communications are enabled. In such an ad-hoc mode, there is not necessarily structure to the network (e.g. there may not be any fixed points, and typically every node is able to communicate with every other node in the ad-hoc network). Support for such an ad-hoc mode has been established in the IEEE 802.11 protocol specification as well as other communications protocol specifications. Accordingly, if portable device B 420 were to request communications with portable device A 410, a program running on portable device A 410 may transition the portable device into an ad-hoc communications mode automatically from an infrastructure mode or any other mode of communications. Thus, peer-to-peer communications between portable device A 410 and portable device B 420 may be established. The use of peer-to-peer communications across a link 430 allows simplified exchange of information from portable device A 410 to portable device B 420 without going through a localized or non-localized communications network.

In an alternative embodiment, a portable electronic device having wireless communication capabilities may be configured as a repeater. The portable device may be configured for providing communications between the portable device and a communications network. Further, the portable electronic device may be configured to transition between an ad-hoc networking mode and an infrastructure mode or a fixed network communications mode and as a repeater be placed in a fixed network communications mode. The communications network may provide a plurality of network user nodes for which communication may be established therewith. A data signal may be received by the portable repeater device for communicating with a network user node. The portable electronic device being in a fixed communications mode or infrastructure mode will then be able to forward the data signal wirelessly to the network user node through the wired network or other communications network. Accordingly, the portable device configured in the fixed network communications mode or infrastructure mode acts as a repeater.

Figure 5:
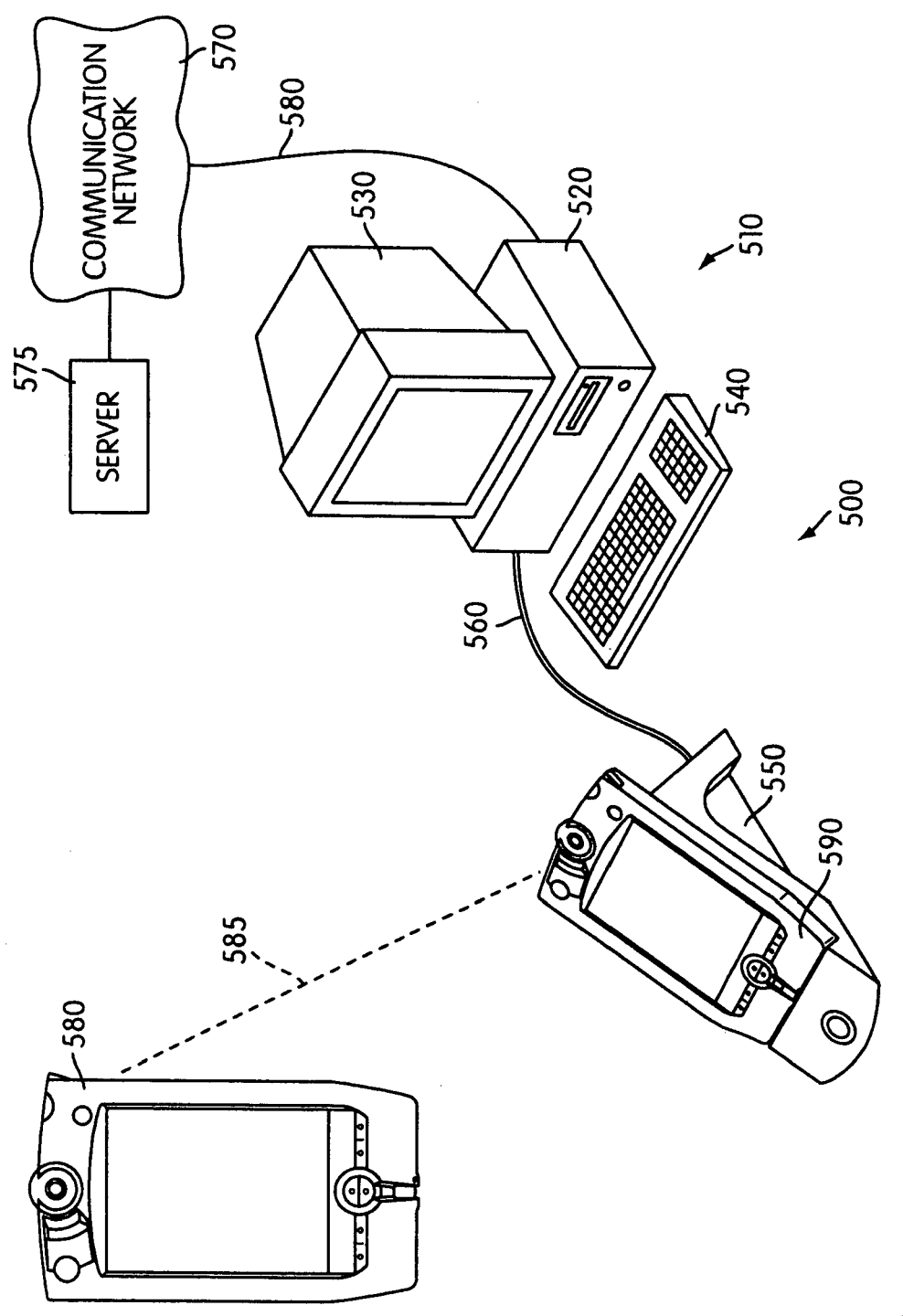
FIG. 5 is an exemplary illustration of a handheld computer communicating with a communications network via a second handheld computer coupled to a desktop computer via a synchronization cradle.

Referring now to FIG. 5, an exemplary communications system 500 is depicted. Communications system 500 includes a desktop computer 510 including a central processing unit 520, a display 530, and a keyboard 540, among other possible peripherals and configurations. In an exemplary embodiment, a synchronization cradle 550 is coupled to and in communication with desktop computer 510 via a communications line which may be a universal serial bus (USB) line 560. Further, desktop computer 510 may be coupled to and in communication with communications network 570 via any of a variety of communications lines 580, including but not limited to, DSL lines, cable modem lines, T1 lines, PSTN lines, and the like. In an exemplary embodiment, a server 575 is coupled to communications network 570. If a handheld computer 580 requests information from server 575 while handheld computer 580 is mobile, handheld computer 580 may communicate with server 575 via an access point connected to communications network 570. In an exemplary embodiment, a handheld computer 590 may act as such an access point. Handheld computer 590 may have a program stored in the memory of the computer and running on the processor which transitions automatically the handheld computer from an ad-hoc or other communications mode to an infrastructure mode in which handheld computer 590 may act as a access point. Thus, handheld computer 580 establishes a wireless communications link 585 with handheld computer 590. Because handheld computer 590 is disposed in cradle 550, direct communications with desktop computer 510 may be made via line 560. Subsequently, communications with communications network 570 may be made over line 580 to server 575. Alternatively, cradle 550 or computer 520 may include wireless units capable of establishing communication link 585.

In a particular exemplary embodiment, handheld computer 590 is automatically transitioned to an infrastructure mode when it is placed in cradle 550. In another exemplary embodiment, handheld computer 590 automatically transitions to the infrastructure mode when a request is received to communicate with communications network 570 from handheld computer 580. The automatic transitioning, whether it is done by a signal from the cradle, a signal from another mobile device, or other signal, provides simplified usage of handheld computer 590 as an access point because a user is not required to carry out any manual switching between the two communications modes. Further, a user of handheld computer 580 does not have to be concerned whether handheld computer 590 may or may not be in the proper communications mode because transitioning between the infrastructure mode and the ad-hoc mode is carried out without user interaction.

An exemplary embodiment may utilize, be executed by, and/or be applied in a handheld computer including a processor such as but not limited to a Dragonball processor running at clock speeds of 33 MHz, 66 MHz, or other clock speeds, the Dragonball processor being available from Motorola Inc. of Schaumburg, Ill. An exemplary handheld computer may also include, but is not limited to, four (4) megabytes (MB) of flash read only memory (ROM) for storing BIOS information, operating system information, and other information. The flash ROM may be used to store, but is not limited to, any of a number of versions of the Palm operating system (OS) available from Palm, Inc. of Santa Clara, Calif. Further, an exemplary handheld computer may also include, but is not limited to, thirty-two (32) MB of synchronous dynamic random access memory (SDRAM) for storing program information, and other information to be used by the handheld computer. In an alternative embodiment, the handheld computer may also use a digital signal processor including an advanced RISC machine (ARM) processor available from Texas Instruments of Dallas, Tex. and may use, but is not limited to, a Linux based operating system.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A portable electronic device, comprising:
a wireless transceiver;
a processor coupled to the wireless transceiver;
a memory coupled to the processor; and
a program stored in the memory and running on the processor, the program providing automatic transitioning between a wireless infrastructure communication mode to an ad-hoc communication mode, the infrastructure mode being used when a request from a mobile device is received to access a communications network, and the program being configured to automatically transition from the wireless infrastructure communication mode to the ad hoc communication mode when a request from the mobile device is received to access resources on the portable electronic device;
wherein the portable electronic device is configured as a repeater when in the infrastructure mode.

2. The portable electronic device of claim 1, wherein the wireless transceiver supports the IEEE 802.11 wireless communications protocol.

3. The portable electronic device of claim 1, wherein the wireless transceiver supports the Bluetooth wireless communications protocol.

4. The portable electronic device of claim 1, wherein the portable electronic device is a handheld computer.

5. The portable electronic device of claim 1, wherein a connection to the communications network is through a wireless access point.

6. The portable electronic device of claim 1, wherein a connection to the communications network is through a synchronization cradle coupled to a computer having a connection to the communications network.

7. A method of using a handheld computer for ad-hoc networking, comprising:
receiving an ad-hoc communications request from a mobile device; and
automatically transitioning the handheld computer from an infrastructure communications mode to an ad-hoc communications mode upon receipt of the request;
wherein the handheld computer is configured to forward a data signal from the mobile device to a communications network when in the infrastructure communications mode.

8. The method of claim 7, further comprising:
communicating between the handheld computer and the mobile device.

9. A portable device configured as a repeater, comprising:
means for providing communications between the portable device and a wired network;
means for automatically putting the portable device in a fixed network communications mode;
means for receiving a data signal wirelessly;
means for forwarding the data signal wirelessly to a network user node; and
means for automatically transitioning the portable device from the fixed network mode to an ad hoc network mode based on receiving a request for access to resources on the portable device.

10. The portable device of claim 9, wherein the means for providing communications includes a synchronization cable coupled to a computer.

11. An access point, comprising:
a handheld computer;
a transceiver associated with the handheld computer for receiving a wireless transmission; and
a program running on the handheld computer that automatically transitions the handheld computer into an infrastructure mode when the handheld computer is in communication with a communications network and a mobile device requests access to the communications network;
wherein the handheld computer is configured to wirelessly forward a data signal received from the mobile device to the communications network when the handheld computer is in the infrastructure mode; and
wherein the program automatically transitions the handheld computer to an ad-hoc networking mode when the mobile device requests access to the handheld computer.

12. The access point of claim 11, wherein the wireless transmission uses an IEEE 802.11 protocol.

13. The access point of claim 11, wherein the wireless transmission uses a Bluetooth protocol.

14. A method of using a handheld computer as a wireless access point, comprising:
- providing a direct communications link between a handheld computer and a communications network;
- transitioning the handheld computer from an ad-hoc network mode to an infrastructure mode when access to the communications network is requested by a mobile device; and
- forwarding, over a wireless communications channel, data from the mobile device to the communications network.

15. The method of claim 14, wherein the transitioning step occurs automatically.

16. The method of claim 14, wherein the communications network includes the internet.

17. The method of claim 14, wherein the communications network includes a local area network.

18. A method of using a handheld computer as a wireless access point, comprising:
- providing a direct communications link between a handheld computer and a communications network;
- transitioning the handheld computer from an ad-hoc network mode to a repeater mode when access to the communications network is provided by a synchronization cradle; and
- communicating, over a wireless communications channel, data from the mobile device to the handheld computer and to the communications network.

* * * * *